United States Patent [19]

Morita et al.

[11] 4,082,858

[45] Apr. 4, 1978

[54] SWEETENING COMPOUND, METHOD OF RECOVERY, AND USE THEREOF

[75] Inventors: Toyoshige Morita, Takatsuki; Isamu Fujita, Kashihara; Junichi Iwamura, Yao, all of Japan

[73] Assignee: F. K. Suzuki International, Inc., Arlington Heights, Ill.

[21] Appl. No.: 692,218

[22] Filed: Jun. 2, 1976

[30] Foreign Application Priority Data

Jun. 4, 1975   Japan ................................ 50-067335

[51] Int. Cl.$^2$ .......................... A23C 3/00; C07H 15/00
[52] U.S. Cl. ................................... 426/597; 424/180; 426/658; 426/660; 536/4; 536/1
[58] Field of Search ...................... 536/4, 5; 424/180; 426/658, 72, 660, 597

[56] References Cited

U.S. PATENT DOCUMENTS 3,723,410   3/1973   Persinos ................................. 536/4

OTHER PUBLICATIONS

Wood et al., "Chem. Abst.", vol. 50, 1956, p. 5,181(d).
Gloria, "Chem. Abst.", vol. 67, 1967, p. 84,917(y).

Primary Examiner—Johnnie R. Brown
Attorney, Agent, or Firm—John S. O'Brien

[57] ABSTRACT

A sweetening compound is recovered from Stevia rebaudiana plant material in the form of colorless crystals having 450 times the sweetness of sucrose. Sweetened products for oral ingestion are provided by admixing the sweetening compound with a foodstuff or a pharmaceutical. The sweetening compound is recovered from the plant material by extraction with water, concentration, extraction with an alkanol, chromatography, and collection of fractions rich in the compound, preferably followed by concentration of the rich fractions and recrystallization of the product.

6 Claims, 1 Drawing Figure

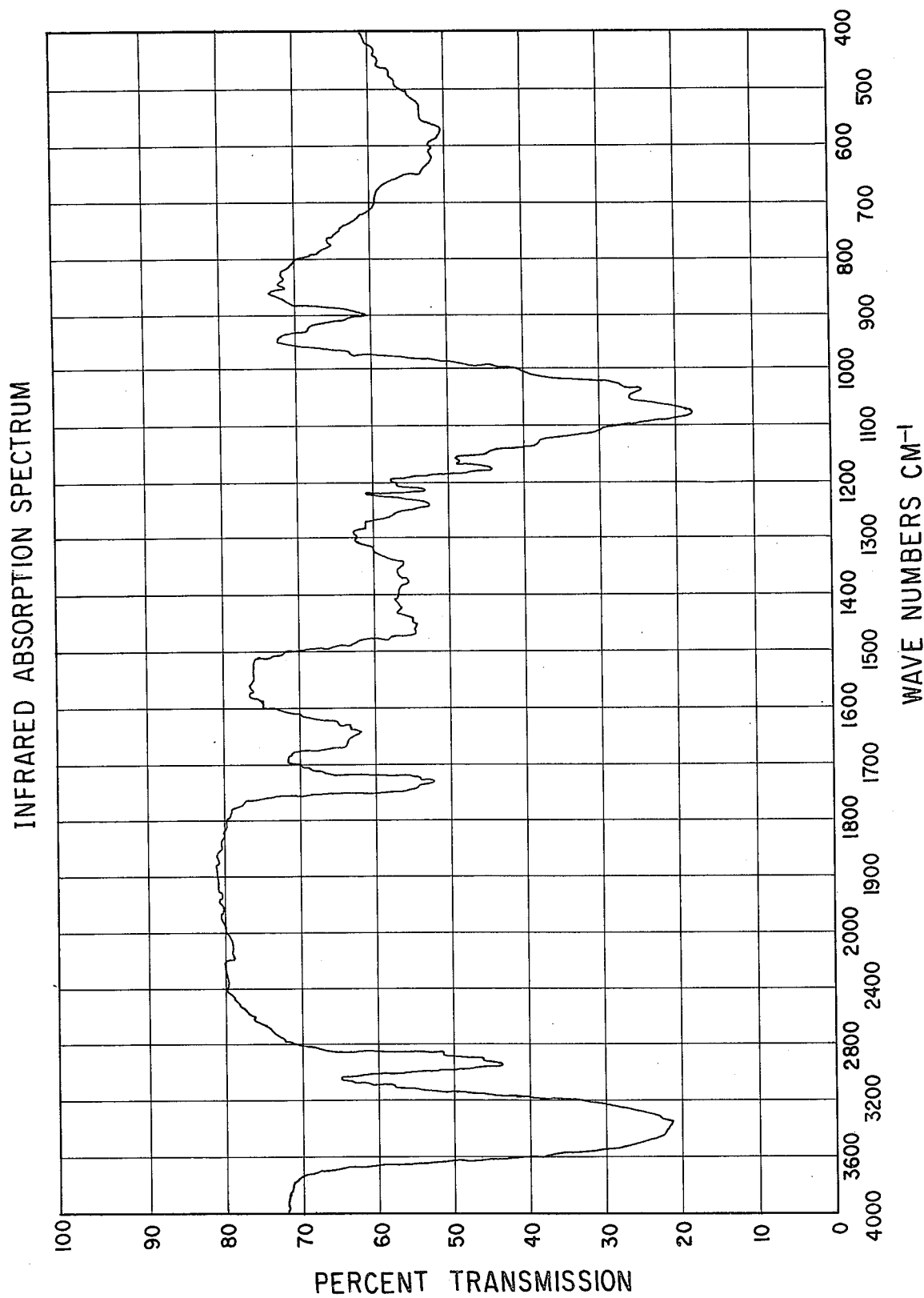

SWEETENING COMPOUND, METHOD OF RECOVERY, AND USE THEREOF

BACKGROUND OF THE INVENTION

This invention relates to a natural sweetening compound, the recovery thereof from Stevia rebaudiana plant material, and the use thereof as a sweetener for foodstuffs and pharmaceuticals.

In view of the questionable safety of the artificial sweeteners, such as the cyclamates and saccharin, it has become more desirable to provide natural sweeteners, particularly, which may serve to replace sucrose. Various natural sweeteners have disadvantages in their degree of sweetness, sugar-toxin, fermentation, souring, and browning by Meillard reaction with amino acids. The sweetener, glycyrrhizin, found in the licorice plant, has 250 times the sweetness of sucrose, but it has an unpleasant taste and slow latent sweetness.

Stevia rebaudiana (Bert.) Hemsl. (Compositae), herein referred to as Stevia rebaudiana, is a plant native to Paraguay, and the plant has long been used as a sweetening agent. The sweetening compound, stevioside, has been recovered from the plant, and it has 300 times the sweetness of sucrose. Stevioside has the disadvantage that it is sparingly soluble in water, so that it is difficult to dissolve in foods. Also, it has slow latent sweetness, strong bitterness, and an unpleasant after-taste.

SUMMARY OF THE INVENTION

The invention provides a crystalline compound, hereinafter referred to at times as sweetening compound (X), which has 450 times the sweetness of sucrose, and overcomes various disadvantages of prior sweeteners. In particular, the sweetening compound is water-soluble, closely resembles sucrose in latent sweetness, and has no bitter or unpleasant after-taste. Inasmuch as the sweetening compound is water-soluble, the sweet taste does not remain in the mouth for too long a time. Consequently, the sweetening compound may be employed alone or in combination with other sweeteners in foodstuffs, including liquids and solids, and pharmaceuticals where sweetness is required, to provide a good quality sweet taste.

The sweetening compound (X) has the molecular formula $C_{44}H_{70}O_{23}$, a molecular weight of 966, and the structural formula:

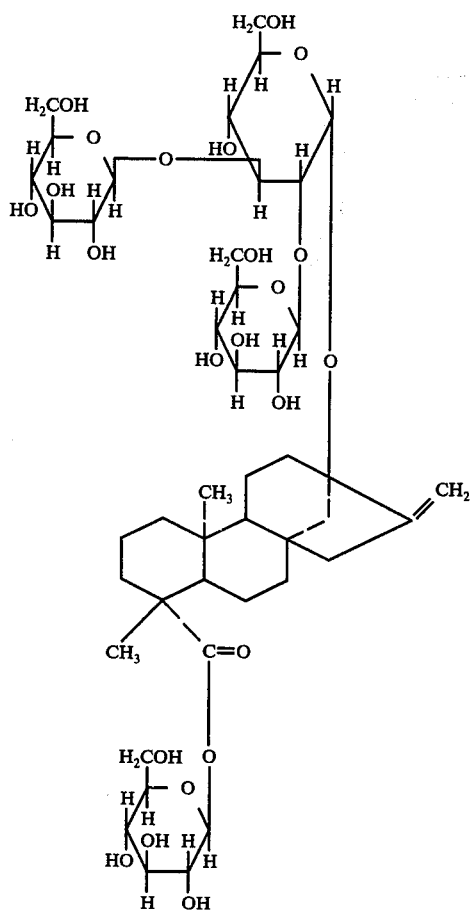

Glucopyranose is combined to all beta-conformation in the aglucon of the compound.

In accordance with the invention, the sweetening compound (X) is obtained from Stevia rebaudiana plant material by extraction and separation from accompanying extracted substances. The extracted substances also include the sweetening compound, stevioside, and in the recovery of the sweetening compound (X), a separation of the two compounds is accomplished, to provide the sweetening compound (X) free of stevioside.

In a preferred embodiment of the invention, the sweetening compound (X) is extracted from Stevia rebaudiana plant material by contacting with water, the extract is concentrated, the compound is extracted from the concentrate by contacting with an alkanol having 1-3 carbon atoms, the alkanol-extracted substance is chromatographed, and effluent fractions rich in the sweetening compound (X) are collected. Preferably, the effluent is concentrated and recrystallized, to provide the pure crystalline sweetening compound.

The invention also provides a method of sweetening a foodstuff or a pharmaceutical, wherein the foodstuff or pharmaceutical is admixed with an effective amount of the sweetening compound (X). A new sweetened product for oral ingestion thereby is provided.

DESCRIPTION OF THE PREFERRED EMBODIMENTS

The sweetening compound (X) is obtained from the plant Stevia rebaudiana preferably by extraction from the plant leaves, employing water as the extracting solvent. After concentration to remove water from the extract, the concentrate is extracted by a 1-3 carbon atom alkanol, to dissolve the sweetening compound (X) therefrom. The useful alkanols include methanol, ethanol, n-propyl alcohol, and isopropyl alcohol, the preferred solvent being methanol. The solvent is removed, to provide a concentrate of the sweetening compound in the form of a syrup.

The alkanol-extracted material is chromatographed, preferably on a silica gel column. A solvent suitable for fractionating or separating the components of the extracted material is selected, and the concentrate is dissolved therein. In particular, a solvent system which will separate the sweetening compound (X) from stevioside is employed. A preferred solvent system is n-propyl alcohol: water: ethyl acetate. Another suitable solvent system is chloroform-methanol-water.

Effluent or eluate fractions from chromatography are collected which are rich in the sweetening compound (X). In particular, the fractions are collected which contain the compound exhibiting an Rf value of about 0.35, characteristic of sweetening compound (X), when subjected to thin-layer chromatography on a silica gel plate employing as the developing solvent a mixture of 2.7 parts of n-propyl alcohol, 1.3 parts of water, and 6 part of ethyl acetate, said parts being by volume. If desired, the presence of the sweetening compound (X) may be ascertained by chromatography with another suitable solvent system, with which the compound exhibits a characteristic Rf value. Such a system is a mixture of 30 parts of chloroform, 20 parts of methanol, and 4 parts of water, in parts by volume, with which sweetening compound (X) exhibits an Rf value of 0.32 in chromatography on a silica gel plate.

The rich effluent or eluate fractions from chromatography contain the sweetening compound (X) in a high degree of purity, and the compound may be recovered therefrom in useful form as a crystalline powder by removal of solvent. Preferably, the pure compound is provided by recrystallization of the powder so obtained, a preferred solvent for recrystallization being a mixture of water and amyl alcohol.

The pure sweetening compound (X) thus obtained, having the molecular weight and the molecular and structural formulae set forth hereinabove, is in the form of colorless crystals, which are obtained as needles in an odorless powder, and which have a sweetness 450 times that of sucrose. The compound in potassium bromide pellet exhibits the infrared absorption spectrum shown in the accompanying single drawing figure. The compound exhibits a characteristic absorption maximum at 1730 cm$^{-1}$. Other properties of the pure compound are as follows:

Melting point: 248–250° C.
Specific rotation: $[\alpha]_D^{25} - 20°$ in methanol (C=1.0)
Solubility: Soluble in water, methanol, ethanol, n-propyl alcohol, isopropyl alcohol, and pyridine. Insoluble in acetone, benzene, chloroform, and ether.
Thin-layer chromatography (T.L.C.):
(1) Developing solvent (in parts by volume): 2.7 parts n-propyl alcohol, 1.3 parts water, 6 parts ethyl acetate
   Plate: Silica gel, Yamato Replate-50, 5 × 20 cm. (Yamato Chem. Co., Ltd., Japan)
   Activation: 110° C., 30 minutes
   Method: Ascending technique
   Color producing reagent: 50% sulfuric acid
   Transfer rate:
   Rf = 0.35 (= distance from origin to sample spot ÷ distance from origin to permeated solvent head)
   (Rf for stevioside = 0.52)
(2) Developing solvent (in parts by volume): 30 parts chloroform, 20 parts methanol, 4 parts water
   Plate: Silica gel, 60F$_{254}$, 5 × 10 cm., layer thickness 0.25 mm. (Mallinckrodt Chemical Works)
   Activation: 80° C, 10 minutes
   Method: Ascending technique
   Transfer rate: Rf = 0.32 (Rf for stevioside = 0.41)

The foregoing properties may be compared and contrasted with the properties of stevioside. Stevioside, are reported in the literature, includes three glucose moieties, whereas the sweetening compound (X) includes four glucose moieties. The infrared absorption spectra of the respective compounds are very similar, the sweetening compound (X) having a distinctive maximum at 1730 cm$^{-1}$, as noted above. Among other distinguishing properties, stevioside has a melting point of 198° C., is sparingly soluble in water (approximately 0.13%), is slightly soluble in alcohol, and is soluble in chloroform. Comparative Rf values are included in the above listing of properties for the sweetening compound (X).

The sweetener compound (X) may be incorporated in a foodstuff, including liquids and solids, or in a pharmaceutical composition in a small minor amount corresponding to its strength as a sweetener, i.e., 450 times as strong as sucrose and 1.5 times as strong as stevioside. The examples which follow show representative proportions which may be employed. The sweetening compound may be employed as the sole sweetener, or it may be used together with stevioside, saccharin, aspartylphenylalanine methyl ester, sodium cyclamate, sorbitol, mannitol, maltitol, xylose, glycyrrhizin, neohesperdin dihydrochalcone, lactose, glucose, sucrose, and other sweeteners. A useful mixture of sweetening agents is provided by mixing 100 parts by weight of stevioside with 20–550 parts of the sweetening compound (X), for use in either a liquid or powder composition.

The following examples illustrate the recovery of the sweetening compound (X) and the use thereof in foodstuffs and pharmaceuticals It will be understood that the invention is not limited to the materials, proportions, conditions and procedures set forth in the examples, which are only illustrative.

EXAMPLE 1

A two hundred-gram quantity of air-dried leaves of Stevia rebaudiana was extracted twice with 1,000 ml. of hot (65°–100° C) water, and the extract was freed of water by concentration in vacuo. The concentrate was extracted by contacting twice with 400 ml. quantities of methanol. Methanol was removed from the combined extracts in vacuo, to produce a honey-like syrup (45 g.).

The concentrate (syrup) was chromatographed on a silica gel column (2.5 cm. diam. × 50 cm. in height, 100 mesh; Mallinckrodt Chemical Works). The solvent for column chromatography was the mixed solvent, n-propyl alcohol:water:ethyl acetate = 2:1:7 (parts by volume). The effluent (eluate) was collected in successive fractions of about 20 ml. each. The fractions were analyzed by thin-layer chromatography (silica gel, 5 cm. × 20 cm., Yamato Replate-50; solvent: n-propyl alcohol:water:ethyl acetate = 2.7:1.3:6.0 in parts by volume; color-producing reagent: 50%-H$_2$SO$_4$). Each of fraction Nos. 81–84, exhibited a single spot, Rf 0.35, in the thin-layer chromatography, indicating the presence of the sweetening compound (X).

Combined fraction Nos. 81-84 were concentrated in vacuo to a crystalline powder, and nearly pure sweetening compound (X) was obtained. Recrystallization of the powder from 1:1 by volume water:n-amyl alcohol gave 98% pure sweetening compound (0.45 g.). When dried at 80° C. in vacuo, the compound melted at 248°-250° C., and showed a rotation of −20° in methanol (C=1.0). Analysis: calculated for $C_{44}H_{70}O_{23} \cdot 3H_2O$: C, 51.70; H, 7.50. Found: C, 52.06; H, 7.77.

Example 2

Vitamin tablets are made from the following composition:

| Material | Quantity Per Tablet |
| --- | --- |
| Vitamin A | 5,000 USP units |
| Vitamin D | 1,000 USP units |
| Vitamin C (ascorbic acid) | 60 mg. |
| Vitamin B1 | 1 mg. |
| Vitamin B2 | 1.5 mg. |
| Vitamin B6 | 1 mg. |
| Vitamin B12 | 2 mcg. |
| Calcium pantothenate | 3 mg. |
| Nicotinamide | 10 mg. |
| Sweetening compound (X) | 1.4 mg. |
| Orange oil | 1.5 mg. |
| Mannitol | 236.2 mg. |
| Corn starch | 16.6 mg. |
| Magnesium stearate | 6.6 mg. |
| Talc | 10 mg. |

Preparation Method

Mix all ingredients except the cornstarch, magnesium stearate and talc. Sieve the mixture through a 20-mesh screen. Mix the cornstarch, magnesium stearate and talc well with the sieved mixture, and make tablets with the resulting mixture.

EXAMPLE 3

Sweetened chocolate is made from each of the following compositions:

| | Proportion, parts by weight | | | | |
| --- | --- | --- | --- | --- | --- |
| | Milk Chocolate | | | | Sweet |
| Material | A | B | C | D | Chocolate |
| Powdered sugar | 33.5 | 38.5 | 36.5 | 61.5 | 47.5 |
| Cocoa paste | 30.0 | 14.5 | 29.0 | 20.0 | 40.0 |
| Cocoa butter | 7.0 | 18.0 | 14.0 | 10.0 | 10.0 |
| Powdered milk | 26.0 | 26.0 | 18.0 | 6.0 | — |
| Lecithin | 0.5 | 0.5 | 0.5 | 0.5 | 0.5 |
| Calcium cellulose glycolate | 2.0 | 1.5 | 1.0 | 1.0 | 1.0 |
| Sweetening compound (X) | 1.0 | 1.0 | 1.0 | 1.0 | 1.0 |

PRODUCTION METHOD

In accordance with the conventional chocolate production method, mix the above materials, knead at 45°-60° C., and after adjusting the temperature to 20°-30° C., mold and cool.

EXAMPLE 4

Sweetened tea is prepared by dipping a packet containing 2.2 g. of black tea in 130 ml. of hot water for 1 minute and adding 0.084 g. of sweetening compound (X).

We claim:

1. A substantially pure sweetening compound in the form of colorless crystals, said compound having the structural formula:

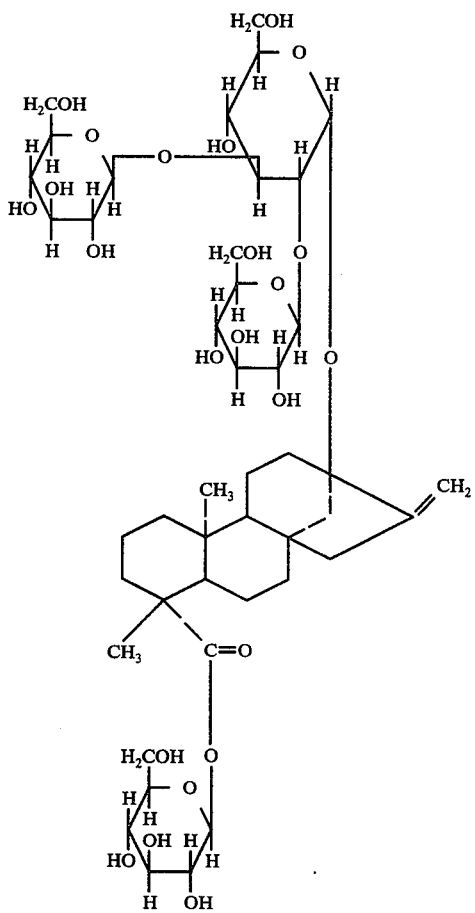

2. A sweetened product for oral ingestion which comprises a foodstuff and an effective amount of the sweetening compound of claim 1 admixed therewith.

3. A method of sweetening a foodstuff which comprises admixing therewith an effective amount of the sweetening compound of claim 1.

4. A product as defined in claim 2 and wherein said foodstuff is chocolate.

5. A product as defined in claim 2 and wherein said foodstuff is tea.

6. A method as defined in claim 3, and wherein said foodstuff is chocolate.

* * * * *

UNITED STATES PATENT OFFICE
CERTIFICATE OF CORRECTION

Patent No. 4,082,858  Dated April 4, 1978

Inventor(s) Toyoshige Morita, Isamu Fujita and Junichi Iwamura

It is certified that error appears in the above-identified patent and that said Letters Patent are hereby corrected as shown below:

Column 4, line 13: Change "are" to --as--;
        5,       52: Insert in the table, at the bottom of the column entitled "Sweet Chocolate" --1.0--;
        5,       60: Change "20°" to --29°--.

Signed and Sealed this

Third Day of October 1978

[SEAL]

Attest:

RUTH C. MASON
*Attesting Officer*

DONALD W. BANNER
*Commissioner of Patents and Trademarks*